W. R. STURGISS.
HOEING MACHINE.
APPLICATION FILED SEPT. 1, 1911.

1,040,589.

Patented Oct. 8, 1912.

WITNESSES

INVENTOR
Wilbur R. Sturgiss
BY
ATTORNEYS

UNITED STATES PATENT OFFICE.

WILBUR R. STURGISS, OF ARCADIA, KANSAS.

HOEING-MACHINE.

1,040,589.　　　　Specification of Letters Patent.　　Patented Oct. 8, 1912.

Application filed September 1, 1911. Serial No. 647,194.

*To all whom it may concern:*

Be it known that I, WILBUR R. STURGISS, a citizen of the United States, and a resident of Arcadia, in the county of Crawford, State of Kansas, have invented a new and useful Improvement in Hoeing-Machines, of which the following is a specification.

My invention is an improvement in hoeing machines, and has for its object the provision of a simple, easily operated and economical machine of the character specified, wherein mechanism is provided for hoeing and thinning of plants in a manner closely resembling the thorough operation of hand working.

Figure 1:
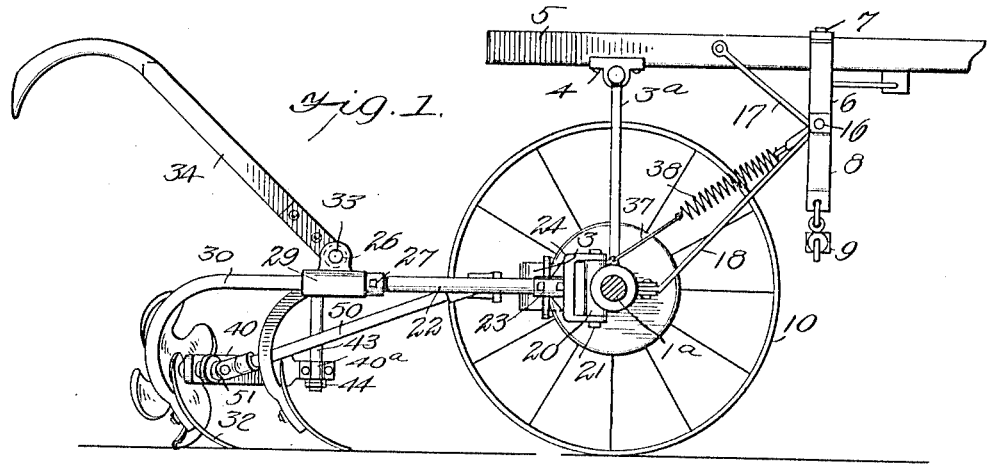
Figure 2:
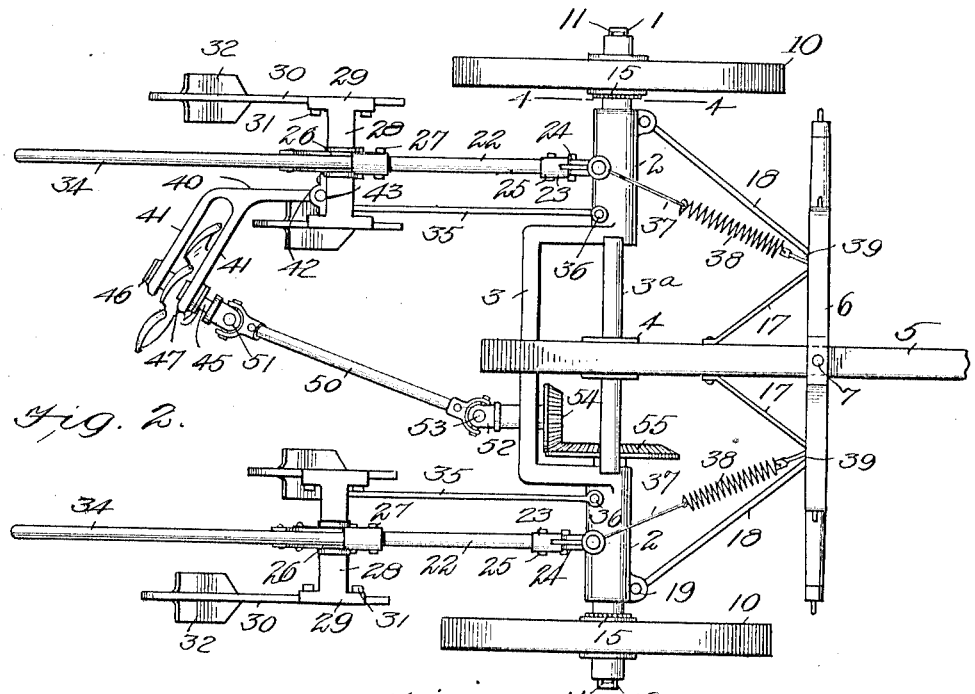
Figures 3, 4:
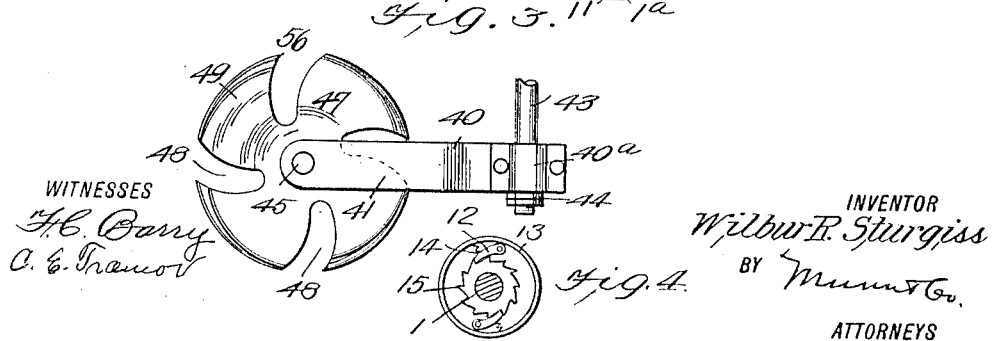

In the drawings:—Figure 1 is a side view of the improvement, Fig. 2 is a plan view, Fig. 3 is a side view of the thinning wheel, and Fig. 4 is a section on the line 4—4 of Fig. 1.

In the present embodiment of the invention, spaced alined spindles 1 and 1ᵃ are provided, and a frame consisting of spaced sleeves 2 connected by substantially U-shaped portions 3 and 3ᵃ is supported by the spindles, each sleeve being journaled on a spindle. The U-shaped portion 3 extends rearwardly from the sleeves and the portion 3ᵃ extends upwardly, and a bearing 4 is journaled on the said portion 3ᵃ, the bearing being secured to a tongue 5 near the rear end thereof. The tongue is provided with a yoke-shaped doubletree 6, the body of the said doubletree being pivoted at 7 to the tongue, while the arms 8 thereof have each connected therewith a singletree 9.

A wheel 10 is journaled on each of the spindles, and is held in place by a linch pin 11, and the wheel on the spindle 1ᵃ is connected to the spindle by the pawl and ratchet mechanism shown in Fig. 4. The said mechanism comprises pawls 12 pivoted within the hub 13 of the wheel, and the said pawls are pressed by springs 14, into engagement with the ratchet wheel 15 secured to the spindle 1. The arrangement is such that as long as the wheel is moved forwardly the axle 1 will be turned therewith. When however, the wheels move rearwardly, the pawls will slip idly over the ratchet wheels.

The arms 8 of the doubletree are connected by rod 16, and brace rods 17 are arranged between the rod and the tongue. Other brace rods 18 are connected at one end to the rod, and at the other to ears 19 on the outer ends of the sleeves 2. Each of the sleeves 2 is provided with a vertical bearing 20 at approximately its center, and a bolt 21 is journaled in each of the said bearings. A yoke consisting of a body 23 and arms 24 is connected with the bolt 21, the arms being arranged at each end of the bearing 20, and having openings through which extends the bolt 21. A plow beam 22 has one end inserted in the body of each yoke and is secured in place by means of bolts 25. A box 26 is secured to the rear end of each beam by means of a bolt 27, and each box has secured thereto a cross head 28. A guide 29 is provided at each end of the cross head and the shank 30 of a cultivating plow is received in each guide 29 and is secured in place by bolts or screws 31. Each shank is provided with a reversible plow point 32, and one of the plows is set ahead of the other. Each box is provided with upwardly extending spaced ears 33, and a handle 34 is pivoted between the ears of each box. A link 35 connects each cross head with the adjacent sleeve, one end of the link being pivoted to the sleeve at 36, while the other end is secured to the cross head. A rod 37 is connected with each of the sleeves near the vertical bearing 20, and the other end of each rod is connected with one end of a spiral spring 38, whose other end is connected to a rod 39 secured to the rod 16, before mentioned.

The above described mechanism is the cultivating mechanism, and a cotton chopping device or thinning device is arranged between the plows. The said device comprises a yoke consisting of a body 40 and spaced arms 41 the body having a bearing 40ᵃ journaled on the lower end of a shaft 43. The shaft 43 is journaled in bearings 42 secured on the inner end of one of the cross heads 28, and the bearing 40ᵃ is held in place on the shaft by means of nuts 44, (Fig. 3).

A stub shaft 45 is journaled in bearings 46 at the ends of the arms 41 of the yoke, and a chopping wheel or disk 47 is secured to the said shaft 45. The chopping wheel as shown in Fig. 3 is provided with spaced substantially radial cuts 48, dividing the peripheral surface of the disk into a plurality of blades 49. Each of the said blades is bent laterally with respect to the plane of the disk as indicated in Fig. 2, and the inner end of the shaft 45 is connected to a shaft 50, by means of a universal joint 51. The opposite end of the shaft 50 is connected to a stub shaft 52 by means of a universal joint 53, the said shaft 52 being journaled in the U-shaped portion 3 of the frame. The forward end of the shaft 52 is provided with a bevel pinion 54 which meshes with a bevel gear wheel 55 on the inner end of the spindle 1ᵃ.

It will be evident that when the frame is drawn through the field, the chopping wheel or disk will be rotated, and each of the blades 49 will remove a portion of the plants in the row, thus thinning the row to the proper number of plants, while at the same time the plows 32 will thoroughly stir and cultivate the ground on each side of the row.

It will be noticed that each of the blades 49 is pointed at its front end at 56, that is, at the end which first engages the ground, and the inclination of all of the blades with respect to the plane of the disk is the same.

I claim:—

1. A machine of the character specified, comprising a frame, wheels for supporting the frame, a plow beam connected with the frame at each side thereof, a plurality of plows supported by each beam, a cutting device for thinning the plants connected with one of the beams, said device comprising a yoke consisting of a body and spaced arms inclined with respect to the body, means for adjustably connecting the yoke body to the beam, a stub shaft journaled in the ends of the arms, a cutting wheel on the shaft between the arms, and a driving connection between one end of the shaft and a wheel, the cutting wheel comprising a disk having spaced substantially radial slots dividing the periphery of the disk into a plurality of blades, each blade having a point at one end, the said blades being inclined in the same direction with respect to the plane of the disk.

2. A machine of the character specified, comprising a frame, wheels for supporting the frame, a plow beam connected with the frame at each side thereof, a plurality of plows supported by each beam, a cutting device for thinning the plants connected with one of the beams, said device comprising a yoke consisting of a body and spaced arms inclined with respect to the body, means for adjustably connecting the yoke body to the beam, a stub shaft journaled in the ends of the arms, a cutting wheel on the shaft between the arms, and a driving connection between one end of the shaft and a wheel, the cutting wheel comprising a disk having spaced substantially radial slots dividing the periphery of the disk into a plurality of blades.

3. A machine of the character specified, comprising a frame, wheels for supporting the frame, a plow beam connected with the frame at each side thereof, a plurality of plows supported by each beam, a cutting device for thinning the plants connected with one of the beams, said device comprising a yoke consisting of a body and spaced arms inclined with respect to the body, means for adjustably connecting the yoke body to the beam, a disk journaled between the arms, and a driving connection between the disks and one of the wheels, said disk having a plurality of substantially radial slots dividing the periphery thereof into a plurality of blades.

4. A machine of the character specified, comprising a frame, wheels for supporting the frame, a plow beam connected with the frame at each side thereof, a plurality of plows supported by each beam, a cutting device for thinning the plants connected with one of the beams, said device comprising a yoke consisting of a body and spaced arms inclined with respect to the body, and means for adjustably connecting the yoke body to the beam.

WILBUR R. STURGISS.

Witnesses:
 THOMAS P. HUGHES,
 DENNEY J. SULLIVAN.

Copies of this patent may be obtained for five cents each, by addressing the "Commissioner of Patents, Washington, D. C."